C. G. SINCLAIR, Jr.
CABLE HANGER.
APPLICATION FILED MAR. 20, 1919.

1,352,549.

Patented Sept. 14, 1920.

INVENTOR.
C. G. Sinclair Jr.
BY
ATTORNEY.

UNITED STATES PATENT OFFICE.

CHARLES G. SINCLAIR, JR., OF TOWACO, NEW JERSEY, ASSIGNOR TO AMERICAN TELEPHONE AND TELEGRAPH COMPANY, A CORPORATION OF NEW YORK.

CABLE-HANGER.

1,352,549.   Specification of Letters Patent.   Patented Sept. 14, 1920.

Application filed March 20, 1919. Serial No. 283,694.

*To all whom it may concern:*

Be it known that I, CHARLES G. SINCLAIR, Jr., residing at Towaco, in the county of Morris and State of New Jersey, have invented certain Improvements in Cable-Hangers, of which the following is a specification.

This invention relates to supporting devices, and more particularly to means for suspending electrical transmission cables from a messenger wire which is firmly attached to poles spaced at different intervals along a transmission line.

For some time past it has been customary to support aerial telephone, telegraph or power transmission cables by means of rings attached to the messenger wire which is, in turn, supported by and securely attached to poles. These rings vary widely in their form and mode of attachment to the messenger wire, but in general they have been designed so as to grip the strand tightly, and thereby avoid, in so far as is practicable, any movement along the messenger wire, or any lateral movement about said wire as an axis. After the rings have been placed upon the messenger wire, the cable to be supported is drawn through successive rings by any suitable means such as a rope which has been previously threaded through the rings. It has been observed that cables suspended from messenger wires by means of rings have, after varying periods of time, shown signs of wear, such as cutting and cracking where supported by the first few rings on each side of the poles to which the messenger wire is attached.

A careful investigation of the cause of this trouble leads to the conclusion that the cutting or abrasion of the sheath by the rings is caused primarily by the swinging or vibrating of the cable which induces a lateral movement of the cable in the rings near the poles. As a result of this motion the cable sheath rubs against the rings, and is gradually cut away by the wear of the relatively rough surface of the rings. This, of course, permits the entrance of moisture into the cable, and circuit troubles result.

This invention consists in a cable support which is capable of attachment to the messenger wire in a manner which will prevent longitudinal movement along the messenger wire, and is also free to swing laterally with the lateral movement of the cable, thereby substantially avoiding any relative movement of the cable and the cable support, and consequently practically eliminating the abrasive effect heretofore experienced with rings or other cable supports that are rigidly attached to the messenger wire.

Figure 1:
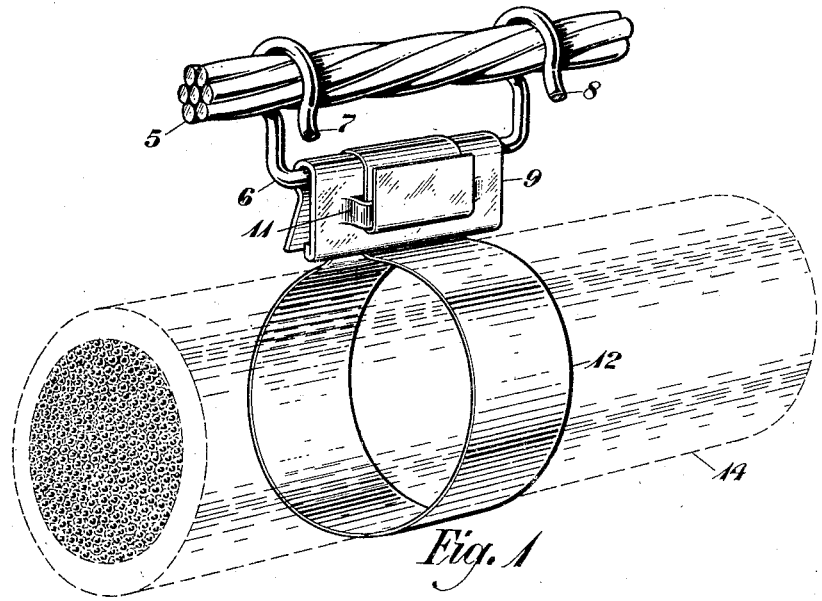
Figure 2:
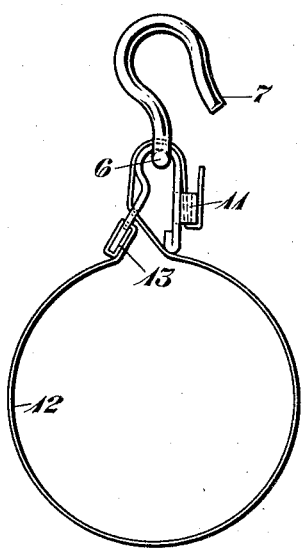
Figure 3:
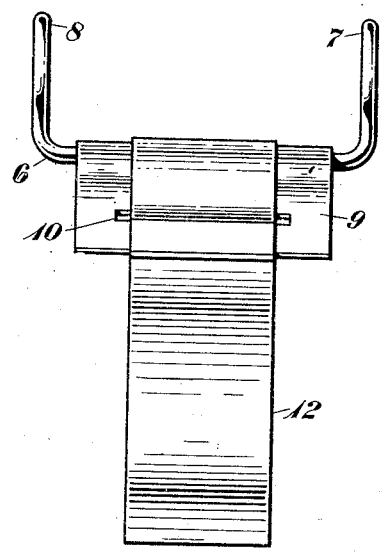

In the annexed drawing, in which like numerals represent like parts throughout, Figure 1 illustrates in perspective the cable support attached to a messenger wire, and constructed in accordance with one embodiment of this invention; Fig. 2 is an end view of said cable support, and Fig. 3 is an elevation of the support taken on the opposite side from that shown in Fig. 1.

This invention will be best understood from the attached drawing, in which 5 represents a messenger wire. A yoke 6 is attached to the messenger wire by means of its hooked members 7 and 8 in a well known manner. The yoke 6 passes through the rounded upper portion of a saddle member 9, and said member is thereby supported and allowed to swing transversely in a suitable arc thereon. On one side of the saddle member is provided a longitudinal slot 10, and on the opposite side said member is slotted and an embossed retaining bar 11 is provided. A strap or band 12 is inserted through the longitudinal slot 10, and its extremity is so bent that it rests in a flat position on the lower edge of said slot and parallel thereto, as more clearly shown in Fig. 2. The strap 12 is turned on itself and binds its extremity and portion 13 securely in place to the lower edge of the slot and lower inner side of the saddle 9, respectively. The strap 12 is then placed around the cable 14 (shown in dotted lines in Fig. 1), inserted through the slot 10 and over the rounded top of the saddle member 9, and drawn taut. Its terminal is then drawn through the embossed retaining member 11 and bent vertically. By this means the cable is securely embraced within the encircling strap and is thus kept tightly in place. Sometimes it is desirable in practice to attach one extremity of the strap 12 to the slot 10, and leave the other portion free, in order that said strap may be placed around cables previously installed whenever it is desired to substitute this type of cable support for the old rigid type. Said strap is of sufficient length to be adjustable to various sizes of cable.

It will be seen, therefore, that by means of this invention the saddle 9 with its associated strap 12 is adapted to swing freely on the yoke 6, and will follow the lateral movement of the cable 14 which is tightly encircled by said strap. Consequently, there is substantially no relative movement between the cable and the cable support in which it rests, and as a result thereof the abrasive effect on the cable sheath is negligible.

Although this invention has been shown as embodied in a particular form, it is to be understood that it is capable of embodiment in many and widely varied forms without departing from the spirit of the invention as defined in the appended claims.

Having thus described my invention, what I claim and desire to secure by Letters Patent is:

1. In a cable supporting device adapted to be secured to a messenger or supporting wire, a yoke provided with hooked members for gripping said wire, a saddle member rotatably mounted on said yoke and provided with a slotted portion and an embossed member, and a band fixed at its respective ends to said slotted portion and embossed member.

2. In a cable supporting device adapted to be secured to a messenger wire, a yoke provided with hooked members for gripping said wire, a saddle member rotatably mounted on said yoke, a longitudinal slot on one side of said saddle member, an embossed member on the opposite side thereof, a band, and means whereby said band is fixed at its respective ends to said longitudinal slot and embossed member.

3. In a cable supporting device adapted to be secured to a messenger wire, a yoke provided with upwardly extending arms terminating in hooked members for gripping said wire, a saddle member rotatably mounted on said yoke, a longitudinal slot provided on one side of said saddle, an embossed member provided on the opposite side thereof, a band associated with said saddle member, means whereby the band overlaps one of its extremities, thereby retaining it in place in the longitudinal slot and adjacent surface of the saddle, and means including said embossed member whereby the other extremity of said band is retained in position.

4. In a cable-supporting device adapted to be secured to a messenger wire, a yoke provided with hooked members for gripping said wire, a saddle member rotatably mounted on said yoke provided with a pair of downwardly extending arms, a longitudinal slot provided in one of said arms, an embossed member provided on the opposite arm, and a band fixed at its respective ends to said longitudinal slot and said embossed member.

In testimony whereof, I have signed my name to this specification this 19th day of March 1919.

CHARLES G. SINCLAIR, Jr.